United States Patent [19]

Licari

[11] Patent Number: 4,597,511

[45] Date of Patent: Jul. 1, 1986

[54] POSITIVE ONE-WAY CHECK VALVE

[75] Inventor: Anthony Licari, Pembroke Pines, Fla.

[73] Assignee: AFA Consolidated Corporation, Hialeah, Miami Lakes, Fla.

[21] Appl. No.: 388,434

[22] Filed: Jun. 14, 1982

[51] Int. Cl.[4] .............................................. F16K 15/14

[52] U.S. Cl. ................................. 222/380; 137/454.6; 137/515.5; 137/843; 137/903; 417/566

[58] Field of Search ............... 222/494, 496, 518, 495, 222/497, 380; 137/843, 852, 540, 543.17, 543.19, 454.4, DIG. 4; 417/566

[56] References Cited

U.S. PATENT DOCUMENTS

| | | | |
|---|---|---|---|
| 3,385,301 | 5/1968 | Harautuneian | 137/843 X |
| 3,827,609 | 8/1974 | Arnaldo | 251/321 X |
| 3,831,629 | 8/1974 | Mackal et al. | 137/DIG. 4 X |
| 4,082,223 | 4/1978 | Nozawa | 222/321 X |
| 4,179,051 | 12/1979 | Thomas | 137/454.2 X |
| 4,201,317 | 5/1980 | Aleff | 222/383 X |
| 4,375,825 | 3/1983 | Greenspan | 137/DIG. 4 X |

*Primary Examiner*—Joseph J. Rolla

*Assistant Examiner*—Frederick R. Handren

*Attorney, Agent, or Firm*—Thomas R. Vigil

[57] ABSTRACT

An insertable, integrally molded, one-piece valve assembly for use in the intake bore of the pump of a liquid dispensing device has a body portion and a top portion which is spaced from the body portion by resilient links. The body portion is pressed into the bore a distance determined by an external stop area, and has a flow passage in which a valve seat is located. The top portion is formed to fit loosely in the bore and abuts against an internal stop area which prevents further inward movement. A compression member extends between the top portion and the body portion and has a valve plug molded on the end which engages the valve seat in normally closed valve relation. The assembly is molded of thermoplastic materials such as polypropylene, polyethylene and mixtures thereof, which plastics are tough and resilient and have excellent "memory" qualities, and is dimensioned for a press fit in the bore under a controlled compressive stress which is taken up mostly by the connecting links and to a lesser extent by the compression member which biases the valve plug against the valve seat.

12 Claims, 6 Drawing Figures

POSITIVE ONE-WAY CHECK VALVE

FIELD OF THE INVENTION

This invention relates to an improvement in check valves used in liquid dispensing or displacement pumps.

DESCRIPTION OF THE PRIOR ART

Various forms of fluid or liquid dispensers have been proposed in the prior art. Many such dispensers employ a manually operable reciprocating pump. In commercially available forms, the pump is incorporated as part of a screw-on closure device for a container of liquid to be dispensed thereby to facilitate removal of the dispenser for refilling the container. Such dispensers may have a trigger or other protruding member for manually operating the pump, usually against the force of a return spring, to the end that liquid may be pumped from the container and dispensed through a liquid ejection nozzle or outlet of the dispenser.

Such liquid dispensers normally employ inlet and outlet check valves in association with the pump which may be lightly spring biased or gravity biased to a seated, that is, a closed position. Such check valves, however, are not intended as static seals to prevent gravity flow of liquid through the dispenser in the event that the dispenser and attached container should be turned upside down. As a result, such dispensers are not normally capable of serving as a shippable closure, that is, a closure capable of sealing the container against leakage of liquid during shipment and/or storage prior to purchase of the dispenser by the consumer. Thus, a separate screw-on closure device or cap must be secured to the container when it is shipped full of liquid, with the dispenser included in the package as a separate device disconnected from the container.

It has been proposed in the prior art to provide a removable leak proof cover or seal for the outlet of such dispensers, a seal which is factory installed to disable the pump mechanism so that the liquid dispensing device can serve as a shippable closure for a liquid filled container. Such a factory sealed dispenser is disclosed in U.S. Pat. No. 3,650,473, C. E. Malone.

In another form of prior art dispenser, as disclosed in U.S. Pat. No. 3,685,739, the nozzle is adjustable on the body of the dispenser and in one adjusted position positively holds the outlet check valve closed thereby disabling the pumping mechanism and serving as a static seal to prevent leakage of liquid from the dispenser outlet.

Such sealing arrangements for preventing leakage from the dispenser when the container is inverted are complex and expensive to manufacture and assemble. In addition, if the seal is to be effective when the dispenser and container are stored between periods of use, manipulative adjustments by the user are required, specifically, replacement of the nozzle cover in the dispenser of U.S. Pat. No. 3,650,473 and readjustment of the nozzle of U.S. Pat. No. 3,685,739 to its closed position.

There thus exists a need and a demand in the art for a means for effecting, without need for attention by the user, a static seal in a liquid dispenser to prevent leakage in the event the dispenser and attached container are placed in an inverted position. In accordance with the present invention, this end is achieved by means of an improved, one-piece, inlet check valve which is easily inserted in the intake bore of a dispenser pump and is positively biased to a seated or closed position. The use of such a positively seated inlet check valve is further advantageous in the operation of a liquid dispensing pump in that liquid is precluded from being ejected in a dribble if the manually actuated trigger is pulled too slowly. With the positively closed inlet check valve, the operator is required to pull the trigger fully and quickly, generating full pumping pressure for liquid to be ejected and sprayed.

There are many patents in the prior art that disclose check valves and other valve arrangements for controlling the flow of liquid. Baum U.S. Pat. No. 1,305,868, for example, shows a water valve for a steam pump having a resilient ring or loop biasing spring in each of the inlet and outlet valves.

Dondero et al. U.S. Pat. No. 2,619,115 discloses a spring biased relief valve for holding the pressure constant at the outlet of a pump and includes a relatively light helical spring and also a heavier helical spring which together hold a closure member upon a valve seat.

Schwartzman U.S. Pat. No. 3,192,553 discloses a dauber for shoe polish or cosmetics comprising a molded plastic discharge valve having a ball closure carried by a conical carrier having a spring formed in helical coils integral therewith.

Schwartzman U.S. Pat. No. 3,203,026 discloses a dauber that is similar to that of U.S. Pat. No. 3,192,553.

Mackal et al. U.S. Pat. No. 3,429,338 discloses an inflation valve of the check type having helically wound leaf spring members for producing rotation of the valve.

Schwartzman U.S. Pat. No. 3,438,554 discloses an anti-suckback device for toothpaste tubes and the like and comprises an integral valve member having a valve head, a valve stem, a ring and helical springs.

Dreri U.S. Pat. No. 3,547,148 discloses a delivery valve mounted in the outlet passage of a liquid fuel pumping apparatus for delivering a predetermined quantity of fuel to an internal combustion engine, the valve including a piston that slides between predetermined limits.

Arnaldo U.S. Pat. No. 3,827,609 discloses an outlet valve for a finger pump type liquid sprayer, the valve having a resilient ring or loop spring which is unitary with the plunger. Variant forms of the spring comprising sinuous, V-shaped and convex are also disclosed.

Corsette U.S. Pat. No. 4,046,292 discloses an inlet check valve for a fluid dispensing finger pump comprising part of a unitary structure which includes the outlet valve, a pump cylinder and a spring that normally urges the outlet valve to its closed position.

Norowski U.S. Pat. No. 4,056,085 discloses a positive crankcase ventillation metering valve.

Nozawa U.S. Pat. No. 4,082,223 discloses a gravity biased, normally closed, ball inlet valve, and a normally closed outlet or discharge valve for a trigger type liquid dispenser, the outlet valve having an elastically deformable ring member.

Thomas U.S. Pat. No. 4,179,051 discloses a reed type one-piece check valve for a fluid dispenser.

All of such prior art valve arrangements are characterized by their complexity, having several parts and being relatively costly to manufacture, assemble and inspect, and by their unsuitability for use as a positively seated inlet check valve for liquid dispensing or displacement pumps.

SUMMARY OF THE INVENTION

An object of the invention is to provide an inexpensive, insertable, one-piece valve structure for use as a positive one-way check valve in the intake or inlet bore of a liquid dispensing pump or similar displacement device.

Another object of the invention is to provide such an inlet check valve that is fabricated of thermoplastic materials and molding resins as a single plastic structure including the valve seat, the valve plug, and all elastic or resilient members.

In accomplishing these and other objectives of the invention, there is provided an inlet check valve structure or assembly comprising integrally molded body and top portions, the top portion being spaced from the body portion by one or more resilient linking members. The body portion is adapted to be pressed into the cylindrical inlet bore of the pump and includes a flow passage in which a valve seat is located. The top portion of the valve assembly is formed to slip easily but not sloppily into the bore when the assembly is inserted therein and engages an internal stop area in the bore. A compression member comprising at least one resilient ring or loop extends between the top portion of the assembly and the valve seat in the body portion. A valve plug molded on the end of the compression member is adapted to engage the valve seat, being urged against the valve seat by a biasing force produced by the compression member.

The valve assembly is molded of a soft plastic material and is dimensioned for a press fit in the intake bore of the pump under a controlled compressive stress that is taken up to a great extent by the resilient linking members and to a lesser extent by the compression member. The assembly has a free length and a shorter installed length due to its compressed state when inserted in the bore of the pump against the inner stop area in the bore.

BRIEF DESCRIPTION OF THE DRAWINGS

A better understanding of the present invention may be had from the following detailed description when read in connection with the accompanying drawings wherein.

DESCRIPTION OF THE PREFERRED EMBODIMENT

FIGS. 1 through 6 of the drawings illustrate an embodiment of the insertable one-piece positive one-way check valve structure or assembly for use in the intake bore of a liquid dispensing pump or similar displacement device.

Figure 1:
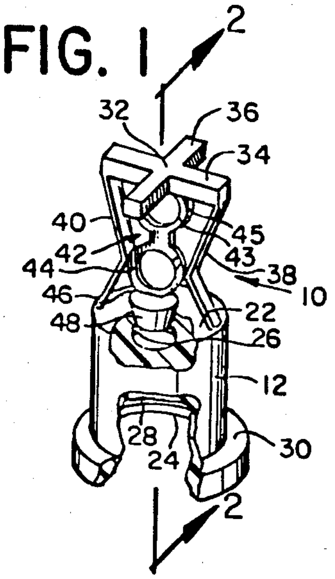
FIG. 1 is a fragmented perspective view of the integrally molded check valve assembly according to the present invention.
Figure 2:
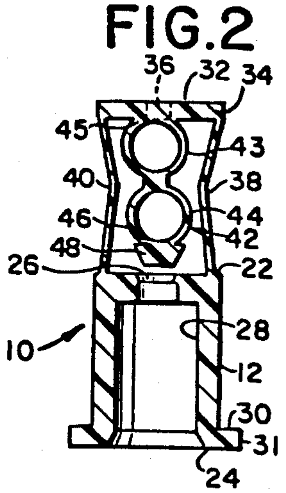
FIG. 2 is a cross sectional view of the valve assembly illustrated in FIG. 1 taken along the lines 2—2.

The valve structure indicated at 10 in FIGS. 1 and 2 of the drawings is integrally molded of a soft plastic material such as polypropylene or polyethylene. The valve structure 10 includes a cylindrical body portion 12 having external dimensions which, as shown in FIGS. 3 through 6, are selected for accommodation thereof in the bore 14 of a cylindrical liquid intake body 16 of a liquid dispensing pump or similar liquid displacement device, not shown, but which typically, may comprise a trigger type liquid dispenser as disclosed in the aforementioned U.S. Pat. Nos. 3,650,473, 3,685,739 or 4,082,223.

Figure 3:
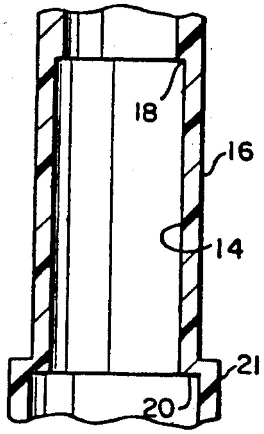
FIG. 3 is a cross sectional view of a portion of the intake bore a pump into which the valve assembly of FIGS. 1 and 2 is adapted to be inserted.
Figure 5:
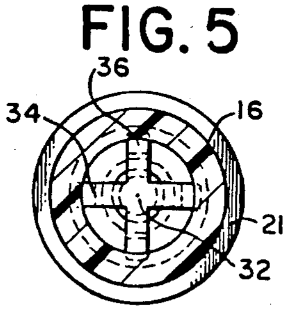
FIG. 5 is a cross sectional view of the pump intake bore, as shown in FIG. 4, taken downstream of and looking upstream at the check valve assembly.

Included within the intake body 16, as seen in FIG. 3, are an inner or upper stop area 18 and an outer or lower stop area or shoulder 20 formed by a portion 21 of the intake body having a larger diameter. The minimum length of the intake body 16, accordingly is determined by the overall length of the valve assembly 10.

The body portion 12 of the valve structure 10, as shown in FIGS. 1 and 2, includes a first end 22 and a second end 24 with a valve seat 26 in the first end 22 and a passage 28 extending from the valve seat 26 to the second end 24. A radially extending outer stop shoulder 30 is provided on a flange 31 that is provided at the second end 24 of body portion 12.

The valve structure 10 further includes a top portion indicated at 32 that has the shape of a cross formed by members 34 and 36. The transverse dimensions of members 34 and 36 are selected for accommodation of the top portion 32 in the bore 14 of intake body 16 in a slip or loose but not sloppy fit. The top portion 32 of structure 10 is connected in spaced apart relation to the body portion 12 by oppositely positioned resilient links indicated at 38 and 40. Link 38 connects one end of member 34 to one side of the end 22 of body portion 12, and link 40 connects the opposite end of member 34 to the other side of the end 22 of body portion 12. While two links 38 and 40 only are shown in the drawing, it will be understood that, if desired, similar links may be provided between the ends of member 36 and the end 22 of body portion 12.

Also included in the valve structure 10 is a compression member 42 comprised of two ring-like members 43 and 44 that are connected end-to-end, two ring-like members being provided instead of one although one would be sufficient, for convenience of molding. Compression member 42 has two ends, for convenience designated a third end 45 and fourth end 46, and is joined at the third end 45 to the top portion 32, the fourth end 46 thereof extending toward the first end 22 of the body portion 12. Joined to the fourth end 46 of the member 42 is a valve plug 48. The valve plug 48 is adapted to engage the valve seat 26 that is provided in the first end 22 of body portion 12, in normally seated or closed valve relation.

In accordance with the invention, the valve assembly 10 has a free length and a predetermined shorter length when inserted in the bore 14 of the intake body 16 with the top portion 32 and the stop shoulder 30 in abutting relation with the stop areas 18 and 20, respectively. Upon insertion of the valve structure 10 into bore 14 of liquid intake body 16, the cross shaped top portion 32 slips into the bore 14 and abuts against the inner stop area 18. Simultaneously, the body portion 12 is pressed firmly into the bore 14 with stop shoulder 30 abutting against the outer stop area 20.

Figure 4:
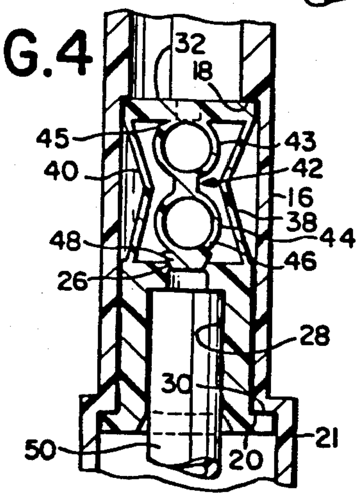
FIG. 4 is a cross sectional view showing the valve assembly of FIG. 2 operatively inserted in the pump intake bore of FIG. 3, with the valve plug in engagement with, that is, seated on, the valve seat.

The valve structure 10, being molded at a length longer than the spacing distance between the stop areas 18 and 20, is compressed during such assembly, urging and placing the valve plug 48 into the valve seat 26. The connecting links 38 and 40 are permanently compressed and the compression member 42 is slightly under compression. All compression is obtained within the connecting links 38 and 40 permanently and within the compression member 42 which forces the valve plug 48 to act as a positive valve. The assembled operative position of valve assembly 10, as illustrated in FIG. 4 shows the arms 34 and 36 of the cross forming top portion 32 in place against the upper stop area 18, the body portion 12 pressed firmly into the bore 14, the stop shoulder 30 in place against the outer stop area 20, the connecting links 38 and 40 permanently compressed, and the compression member 42 slightly under compression.

Figure 6:
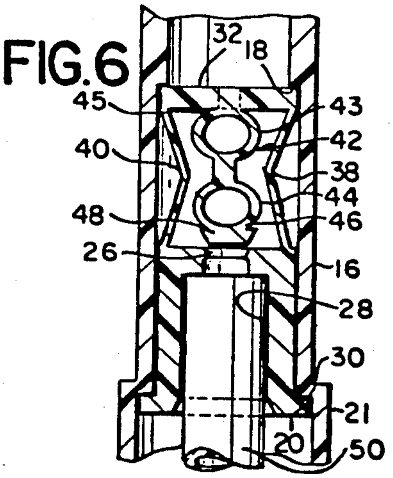
FIG. 6 is a cross sectional view similar to that of FIG. 4 but showing the valve plug in a position off or away from the valve seat.

During function the internal pressure within a pump, such, for example, as that of a liquid dispenser or sprayer, applies pressure or creates a vacuum. That is to say, during the inward stroke of the piston pressure is applied on top of the valve plug 48 seating it firmly against the valve seat 26. At the return stroke of the piston, vacuum is produced. Such vacuum pulls the valve plug 48 away from the valve seat 26, as illustrated in FIG. 6, allowing liquid to pass, such liquid being drawn from a container (not shown) through a straw or dip stick indicated at 50 in FIGS. 4 and 6. The valve plug 48 moves due to the construction of the compression member 42. Upon internal pressure rise the compression member 42 positively forces the valve plug 48 back into position against the valve seat 26 awaiting the next pressure stroke.

Thus, there has been provided, in accordance with the invention, an insertable, one-piece molded structure or assembly for use in the bore of a pump or similar liquid dispenser or displacement device as an intake valve therefor comprising a body portion having a liquid passage and a valve seat in the passage, a top portion connected to the body portion in spaced apart relation, resilient links extending between and integrally joining the body and top portions, and compression means integrally joined to and including a valve plug moldably attached thereto and adapted to be seated in the valve seat in normally closed valve relation, the compression means urging the valve plug into seating engagement with the valve seat when the assembly is inserted in operative position in the bore of the pump.

I claim:

1. An insertable, integrally molded assembly for use as the intake valve in the bore of a pump or similar liquid displacement device comprising:

a body portion having an external dimension selected for accommodation thereof in the bore in a press fit, said body portion being cylindrical and having a first end and a second end, a valve seat in said first end, a passage extending from said valve seat to said second end, and a stop shoulder, a top portion having an external dimension selected for accommodation thereof in the bore in a loose fit, said top portion comprising transverse members forming a cross, being outside of said body portion, being connected in spaced apart relation to said first end of said body portion, and being shaped to pass liquid flow through the bore, resilient means extending between and integrally joining said top portion to said first end of said body portion and comprising a resilient link extending from each of the opposite ends of at least one of said transverse members to said first end of said body portion, a valve plug, compression means having a third end and a fourth end, said compression means being joined at said third end to said top portion and having said fourth end extending toward said first end of said body portion, said valve plug being joined to said fourth end of said compression means and adapted to engage said valve seat in normally closed valve relation, said compression means urging said valve plug into engagement with said valve seat when said assembly is inserted in said bore, said assembly having a free length and a predetermined shorter length when inserted in the bore caused by the compression of said resilient means, with said top portion and said stop shoulder in abutting relation with internal stop areas in the bore.

2. An insertable, one-piece molded assembly for use in the bore of a pump or similar liquid displacement device as an intake valve therefor comprising:

a body portion having a fluid passage and a valve seat in said passage;

a top portion connected to and outside of the body portion in spaced apart relation;

at least one resilient member extending between and integrally joining said top portion to said body portion; and compression means integrally joined to and extending from said top portion including valve plug means moldably attached thereto and adapted to engage said valve seat in normally closed valve relation, said compression means urging said valve plug means into engagement with said valve seat when said assembly is operatively positioned in said bore, and said compression means having a molded apertured member having at least one aperture, said aperture extending entirely through said apertured member, and said apertured member being molded to said top portion and depending therefrom between said top and body portions.

3. An assembly according to claim 2 wherein the body portion is cylindrical the diameter of which is selected for accommodation of said assembly in said bore in a press fit.

4. An assembly according to claim 2 wherein the body portion further includes means for limiting movement of said assembly in said bore.

5. An assembly according to claim 4 in which said means for limiting movement of said assembly in said bore is a radially extending shoulder on said body portion that is adapted to engage the outside of said bore.

6. An assembly of claim 2 further including a cylindrical bore in said body portion adapted to receive a supply conduit in press fit relation for supplying fluid from a fluid source for controlled flow by said valve plug.

7. The assembly according to claim 2 which has an installed length and an uninstalled free length, said installed length being shorter than said uninstalled length.

8. The assembly according to claim 2 wherein said valve plug is attached at the bottom of said apertured member.

9. In combination with the intake bore of a liquid dispensing pump of the type having an outlet check valve and a discharge nozzle.

an inlet check valve comprising a one-piece integrally molded assembly adapted to be press fit in operative position in said bore, said assembly having a top portion and a body portion, said body portion including a valve seat and having a hollow interior, said top portion having the shape of a cross and being adapted to fit loosely in said bore, a compression member having at least one aperture therein, said aperture extending entirely through the compression member, said compression member being attached to said top portion in dependent relation, a valve plug on said compression member, in operative press fitted position of said assembly in said bore, providing control of the flow of liquid through said bore by engaging said valve seat in a normally closed valve relation, and flexible link means extending between the top portion and the body portion and forming a valve spring therebetween whereby compression of said assembly imparts a permanent compression force upon said valve plug that urges said valve plug to seat in said valve seat in said normally closed valve relation.

10. In combination with the intake bore of a liquid dispensing pump of the type having an outlet check valve and a discharge nozzle, an inlet check valve comprising a one-piece integrally molded assembly adapted to be press fit in operative position in said bore, said assembly having a top portion and a body portion, said body portion including a valve seat and having a hollow interior, said top portion having the shape of a cross and being adapted to fit loosely in said bore, at least one ring-shaped compression member attached to said top portion in dependent relation, a valve plug on said compression member, in operative press fitted position of said assembly in said bore, providing control of the flow of liquid through said bore by engaging said valve seat in a normally closed valve relation, and flexible link means connecting said body portion and said top portion and forming a valve spring therebetween whereby compression of said assembly imparts a permanent compression force upon said valve plug that urges said valve plug to seat in said valve seat in said normally closed valve relation, wherein said intake bore is cylindrical and includes an inner stop area against which said top portion of said assembly is adapted to abut with said assembly in operative position in said bore, said bore further having an outer stop area, wherein said body portion is cylindrical and includes a cylindrical bore that is adapted to receive a supply conduit in press fit relation for supplying liquid from a liquid source for controlled flow through said bore by said valve plug wherein said body portion further includes a radially extending shoulder that is adapted to engage said outer stop area of said bore, and wherein the spacing between said inner and outer stop areas is such that when installed in operative position in said bore with said top portion in abutting engagement with said inner stop area and said shoulder of said body portion in engagement with said external stop area, the length of said assembly is shorter than the uninstalled length thereof whereby compressive force is applied to said link means and said compression member.

11. An insertable, integrally molded assembly for use as the intake valve in the bore of a pump or similar liquid displacement device comprising:

a body portion having an external dimension selected for accommodation thereof in the bore in a press fit, said body portion having a first end and a second end, a valve seat in said first end, a passage extending from said valve seat to said second end, and a stop shoulder, a top portion having an external dimension selected for accommodation thereof in the bore in a loose fit, said top portion being outside of said body portion, being connected in spaced apart relation to said first end for said body portion, and being shaped to pass liquid flow through the bore, resilient means extending between and integrally joining said top portion to said first end of said body portion, a valve plug, compression means having a third end and a fourth end, said compression means being joined at said third end to said top portion, having said fourth end extending toward said first end of said body portion, and being an apertured member having at least one aperture, said aperture extending entirely through said apertured member, said valve plug being joined to said fourth end of said compression means and adapted to engage said valve seat in normally closed valve relation, said compression means urging said valve plug into engagement with said valve seat when said assembly is inserted in said bore, said assembly having a free length and a predetermined shorter length when inserted in the bore caused by the compression of said resilient means, with said top portion and said stop shoulder in abutting relation with internal stop areas in the bore.

12. An insertable, integrally molded assembly for use as the intake valve in the bore of a pump or similar liquid displacement device comprising:

a body portion having an external dimension selected for accommodation thereof in the bore in a press fit, said body portion being cylindrical and having a first end and a second end, a valve seat in said first end, a passage extending from said valve seat to said second end, and a stop shoulder, a top portion having an external dimension selected for accommodation thereof in the bore in a loose fit, said top portion comprising transverse members forming a cross, being outside of said body portion, being connected in spaced apart relation to said first end of said body portion, and being shaped to pass liquid flow through the bore, resilient means extending between and integrally joining said top portion to said first end of said body portion and comprising a resilient link extending from each of the opposite ends of at least one of said transverse members to said first end of said body portion, a valve plug, compression means having a third end and a fourth end, said compression means being joined at said third end to said top portion, having said fourth end extending toward said first end of said body portion, and being an apertured member having at least one aperture, said aperture extending entirely through said apertured member, said valve plug being joined to said fourth end of said compression means and adapted to engage said valve seat in normally closed valve relation, said compression means urging said valve plug into engagement with said valve seat when said assembly is inserted in said bore, said body portion further including a flange at said second end, said flange forming said stop shoulder, and having a cylindrical bore that is adapted to receive a supply conduit in press fit relation for supplying liquid from a liquid source for controlled flow by said valve plug, said assembly having a free length and a predetermined shorter length when inserted in the bore caused by the compression of said resilient means, with said top portion and said stop shoulder in abutting relation with internal stop areas in the bore.

* * * * *